(12) United States Patent
Kordahi et al.

(10) Patent No.: US 6,763,170 B2
(45) Date of Patent: Jul. 13, 2004

(54) SYSTEM FOR STORING SPLICES IN A JOINT BOX

(75) Inventors: Maurice Kordahi, Atlantic Highlands, NJ (US); Steven Bernstein, Jackson, NJ (US); Tat Chiu Lee, Manalapan, NJ (US); Tony S. Fong, Manalapan, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 0 days.

(21) Appl. No.: 09/776,060

(22) Filed: Feb. 2, 2001

(65) Prior Publication Data

US 2002/0106176 A1 Aug. 8, 2002

(51) Int. Cl.[7] ................................................ G02B 6/00
(52) U.S. Cl. ...................................... 385/135; 439/137
(58) Field of Search .............................. 385/135, 136, 385/137, 147, 110

(56) References Cited

U.S. PATENT DOCUMENTS

| | | | |
|---|---|---|---|
| 5,790,740 A | | 8/1998 | Cloud et al. |
| 5,802,237 A | * | 9/1998 | Pulido ........................ 385/135 |
| 5,884,003 A | * | 3/1999 | Cloud et al. ................. 385/135 |
| 5,999,668 A | * | 12/1999 | Hernandez et al. ........... 385/12 |

FOREIGN PATENT DOCUMENTS

| | | |
|---|---|---|
| EP | 0216073 | 4/1987 |
| EP | 0393552 | 10/1990 |
| WO | WO 97/32231 | 9/1997 |

* cited by examiner

*Primary Examiner*—Chandrika Prasad (57) ABSTRACT

An apparatus for retaining and protecting spliced optical fibers. Optical fibers forming an extensive network, extending a great distance, are spliced together to provide the communication medium for the network. The apparatus includes a joint box for protecting the splices. Within the joint box is at least one arcuate-shaped splice retainer. The retainer secures the splices in a static position to prevent them from being damaged. Also, the retainer may include more than one arcuate layers for storing the splices. The arcuate layers organize the splices, so they are readily identifiable and accessible. In addition, the arcuate layers make efficient use of the limited space available for storing the splices. The joint box includes a center shelf longitudinally dividing the joint box into two compartments. To accommodate more splices, an arcuate retainer may be provided in each compartment by mounting an arcuate retainer on each side of the shelf.

30 Claims, 6 Drawing Sheets

SYSTEM FOR STORING SPLICES IN A JOINT BOX

CROSS REFERENCE TO RELATED APPLICATIONS

This application is related to commonly assigned U.S. patent application Ser. No. 09/399,752, filed Sep. 21, 1999 and entitled "Fiber Retaining System;" and U.S. patent application Ser. No. 09/399,751, filed Sep. 21, 1999 and entitled "Fiber Retaining System," both of which are hereby incorporated by reference herein.

FIELD OF THE INVENTION

The present invention relates to the retention and protection of spliced optical fibers. More specifically, the invention relates to an arcuate retainer for organizing and securing fiber optic splices.

BACKGROUND OF THE INVENTION

Figure 1:
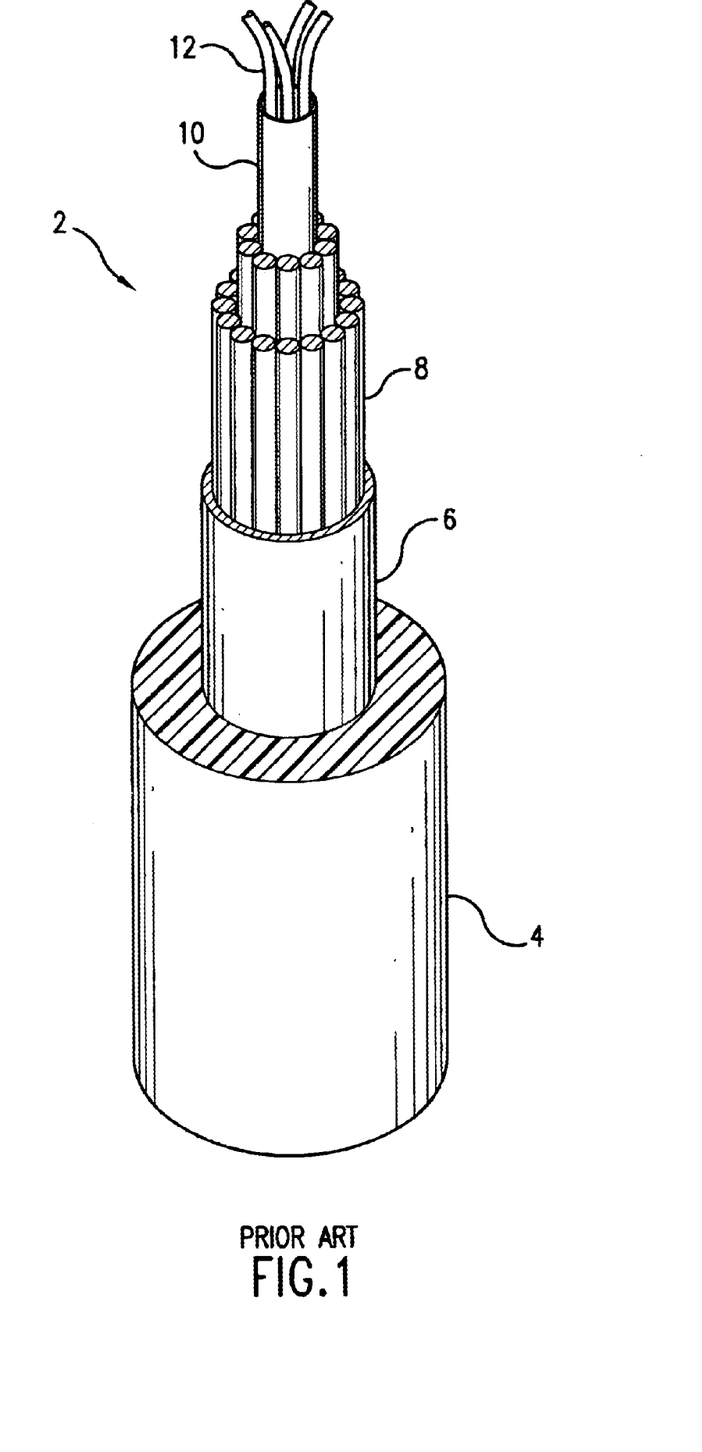
FIG. 1 is an isometric view of a cable.

Communications networks are frequently made of many miles of optical fibers. Indeed, many of the networks can extend between continents and across oceans and other large bodies of water. For protection, the optical fibers are contained in a larger cable. An example of such a cable is shown in FIG. 1. The cable 2 includes an outer insulating plastic coating 4, a copper sheath 6 inside the outer coating 4, and high strength members, such as steel wires 8, inside of the copper sheath 6. A loose tube 10 is contained within the steel wires 8, and one or more isolated optical fibers 12 are contained within the loose tube 10. This permits the fibers 12 to move with respect to the steel wires 8, the sheath 6 and the coating 4. This cable arrangement has been found to be desirable in many high strength applications.

As neither the cables nor the fibers can be made and deployed in infinite lengths, sections of the cables and the fibers are attached together. The fibers are typically attached to each other by a process known as splicing. For protection from the environment, these spliced sections are commonly contained in a watertight housing, which is frequently referred to as a joint box. Such housings or joint boxes are also used when it is necessary to make splices in the field.

In circumstances when tension is applied to the cable, such as during the deployment of the cable underwater by a ship, it is undesirable to have the splice absorb the forces. Thus, on either side of the splice, a great deal of slack, such as three feet of fibers, may be provided to prevent the splice from being stressed. The joined fibers, with their slack, may be coiled onto a center section of the joint box, wound around cylinders or stored in magazines adjacent a center section of the joint box. The splice itself is fixed within the center section.

Traditionally, multiple splices are placed in each joint box. However, most arrangements do not make efficient use of the limited space in a joint box and do not adequately restrain splices to prevent damage. Thus, a need exists to organize splices in a manner that does not lend itself to damaging the splices and makes efficient use of limited space in a joint box.

SUMMARY OF THE INVENTION

In view of the foregoing, it is an aspect of the present invention to provide an arrangement for organizing and protecting spliced optical fibers in a joint box.

It is a further aspect of the present invention to provide an arcuate splice retainer for retaining a plurality splices. The retainer may be in a joint box and may include a first arcuate-shaped storage channel for retaining more than one of the plurality of splices. The retainer may include a first element having a convex surface forming a bottom portion of the first channel, and a second element having a concave surface forming a top portion of the first channel and retaining the more than one splices in the first channel between the first and second elements. The first element may include a center step and end steps in the lateral ends of the first element. The center step and the end steps may extend the length of the first retainer. The retainer may further include a second arcuate-shaped storage channel for storing more than one of the plurality of splices, wherein the second channel is radially spaced from the first channel with respect to a longitudinal axis parallel to longitudinal axes of said plurality of splices. The retainer may also include a third element having a concave surface forming a top portion to the second channel, and the second element having a convex surface forming a bottom portion to the second channel. The splices in the first and second channel may be secured in a static position. The retainer may further include a third arcuate-shaped storage channel angularly spaced from the first channel and radially spaced from the second channel with respect to the longitudinal axis, wherein the third channel is for retaining more than one of the plurality of splices, and the first and third channels are separated by the center step. The second element may be removably attached to said first element, and the third element may be removably attached to the second element.

A further aspect of the present invention may include a joint box with a middle section and a center shelf. The center shelf may longitudinally divide the middle section into first and second compartments, and a first retainer may be positioned on the center shelf in the first compartment. A second retainer may be positioned on the center shelf in the second compartment.

Another aspect of the present invention may include a fiber optical network, and the joint box and splices of the present invention may be a part of the fiber optical network.

The above and other features and advantages of the present invention will be readily apparent and fully understood from the following detailed description of preferred embodiments, taken in connection with the appended drawings.

DETAILED DESCRIPTION OF THE PREFERRED EMBODIMENTS

Figure 2:
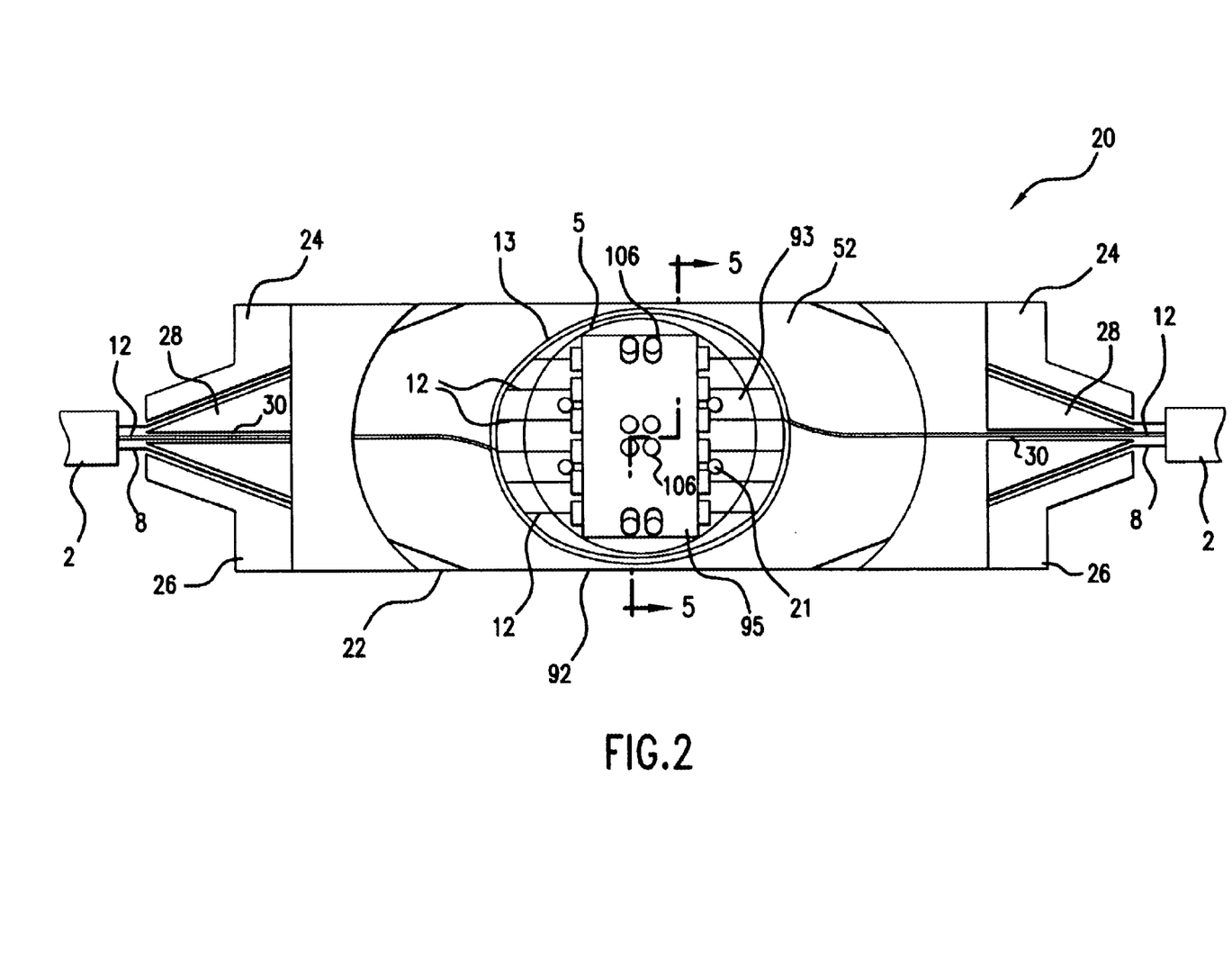
FIG. 2 is a schematic top view of the joint box and the arcuate retainer of the present invention.

Details of the cable and fiber joining system for housing and protecting spliced optical fibers are shown in FIGS. 2–6. FIG. 2 schematically depicts the housing or joint box 20 connecting the free ends of two cables 2 together. The joint box 20 and optical fibers 12 are preferably part of an extensive fiber optical communications network that may extend long distances, e.g. below a large body of water. The cables 2 are preferably of the type shown in FIG. 1 such that the optical fibers 12 can move longitudinally with respect to the remainder of the cable 2. The optical fibers 12 of the cables 2 are joined by splicing the fiber ends, using any well-known method, and creating splices 5. The splices 5 are preferably reinforced with protective sleeves 9 (see FIG. 6) at the area of the splice for protecting the fiber connection. Sufficient slack 13 in the fibers 12 is provided to prevent the splices 5 from being stressed or pulled into one of the cables 2. The slack 13 from the fibers 12 may be coiled onto the shelf 52.

The joint box 20 includes cable termination sections 24 at its longitudinal ends, and a center section 22 disposed between, and connecting, the cable termination sections 24. Each cable termination section 24 includes a body 26 with a cone-shaped hollow cavity therein, and a cone-shaped plug and sleeve configuration 28 that fits within the hollow cavity. The high strength steel wires 8 of the cables 2 are clamped between the hollow cavity of the body 26 and the plug and sleeve 28, and the outer surface of the sleeve is malleable, which deforms around the high strength steel wire 8 as the plug is inserted. The body 26 and the plug and sleeve configuration 28 are hollow along their central axis 30. This enables the fibers 12 to extend unrestrained therethrough.

The center section 22 is disposed between and connected to the cable termination sections 24, and houses and protects the spliced section of the fibers 12. The center section 22 is attached to the cable termination sections 24 by a bayonet-type locking arrangement or any known desirable arrangement. The joint box 20 also includes a cover 14 (see FIG. 5) for enclosing its interior.

Figure 3:
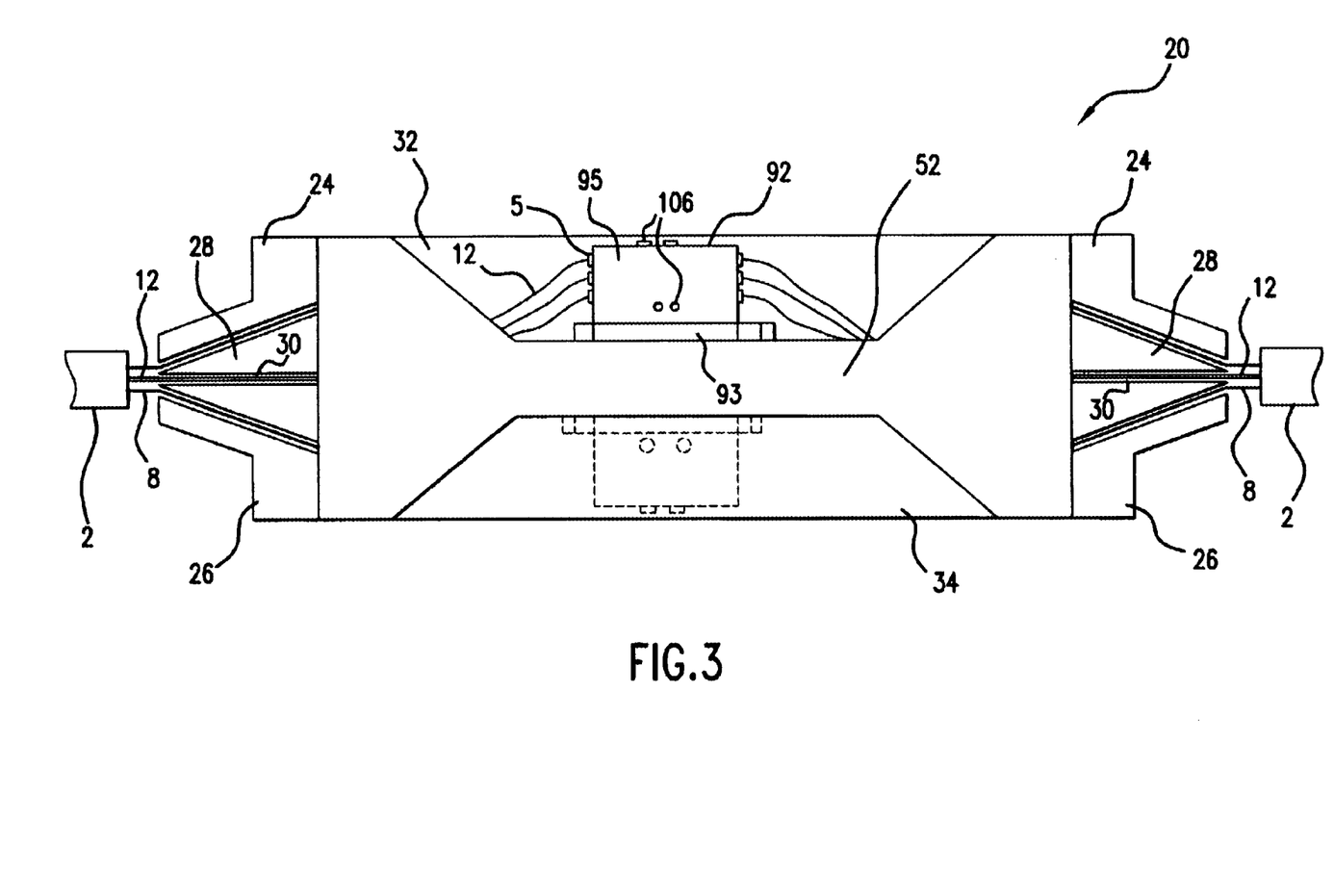
FIG. 3 is a schematic side sectional view of the joint box and the arcuate retainer of the present invention.
Figure 4:
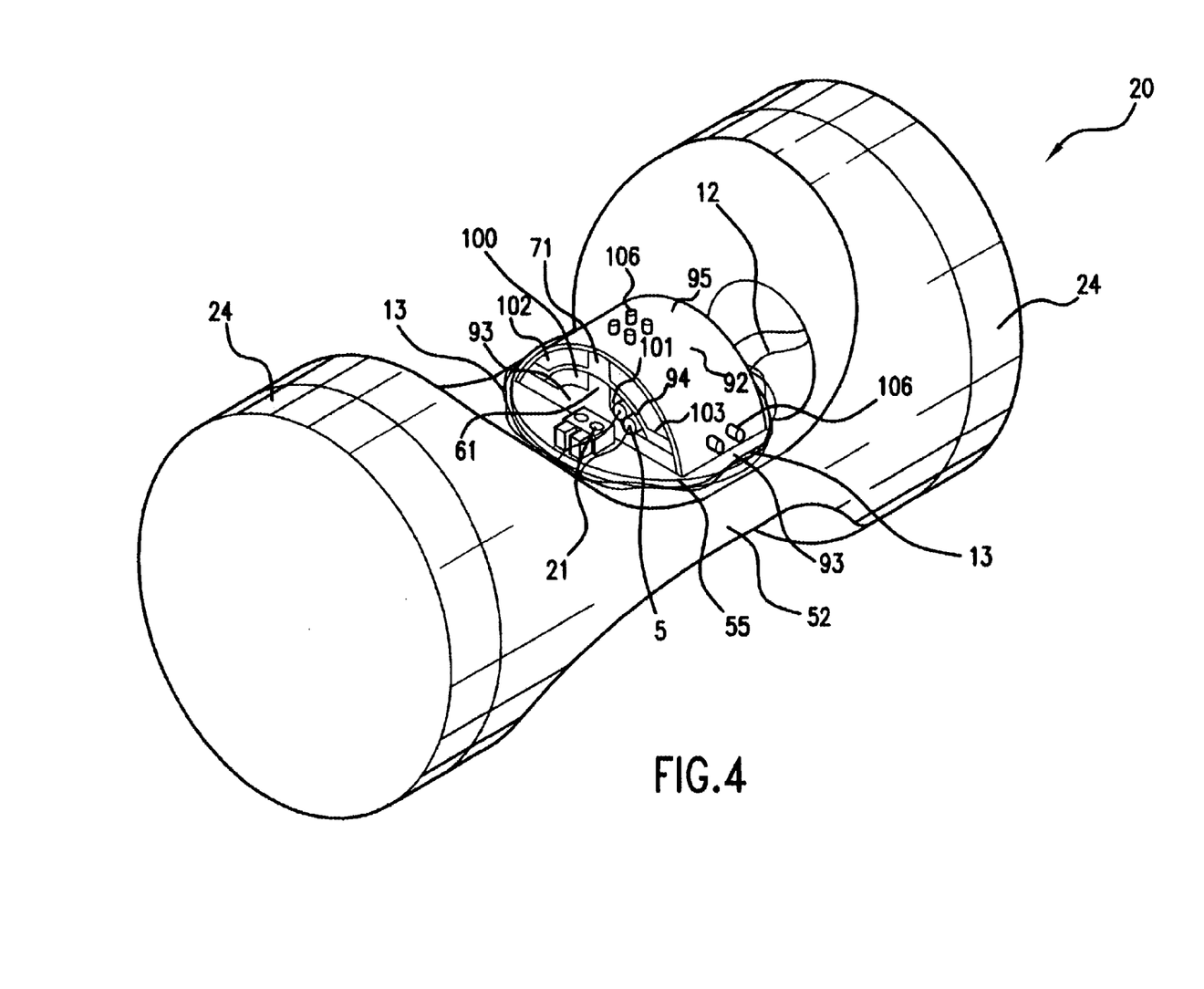
FIG. 4 is a perspective view of the joint box and the arcuate retainer of the present invention.

In a preferred embodiment, the center section 22 includes a shelf 52 that generally divides the center section 22 into upper and lower compartments or sections 32 and 34, as shown in FIG. 3. In such an arrangement, an arcuate retainer 92 can be included on one or both of the upper and lower sides of the shelf 52. FIG. 3 shows an arcuate retainer in upper compartment 32, and an arcuate retainer in lower compartment 34, shown with dashed lines, which may be provided to accommodate more splices. However, it is recognized that a shelf 52 need not be provided and that a single arcuate retainer 92 may be used.

Figure 5:
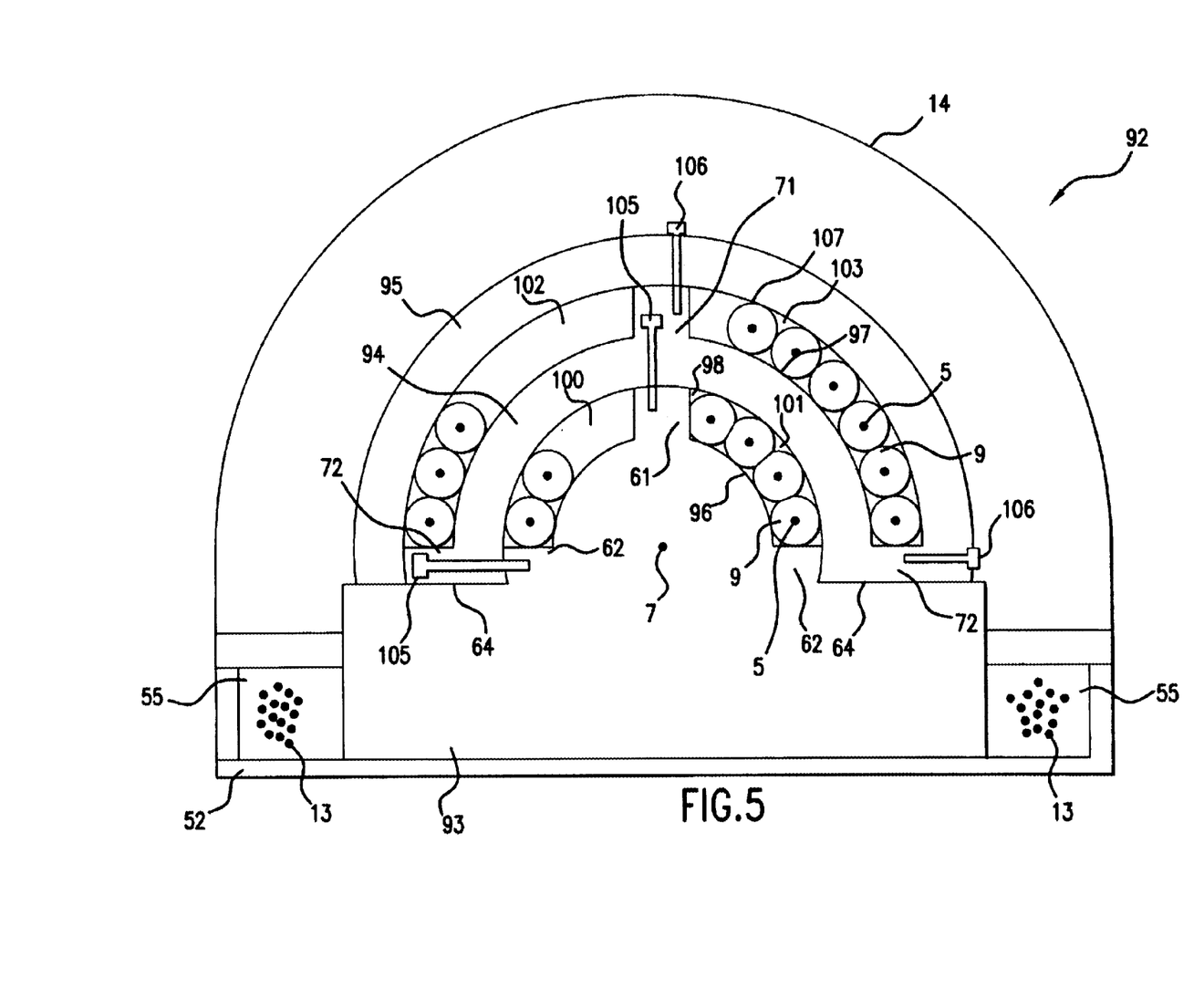
FIG. 5 is a cross-sectional view of the arcuate retainer; taken through line 5—5 of FIG. 2.
Figure 6:
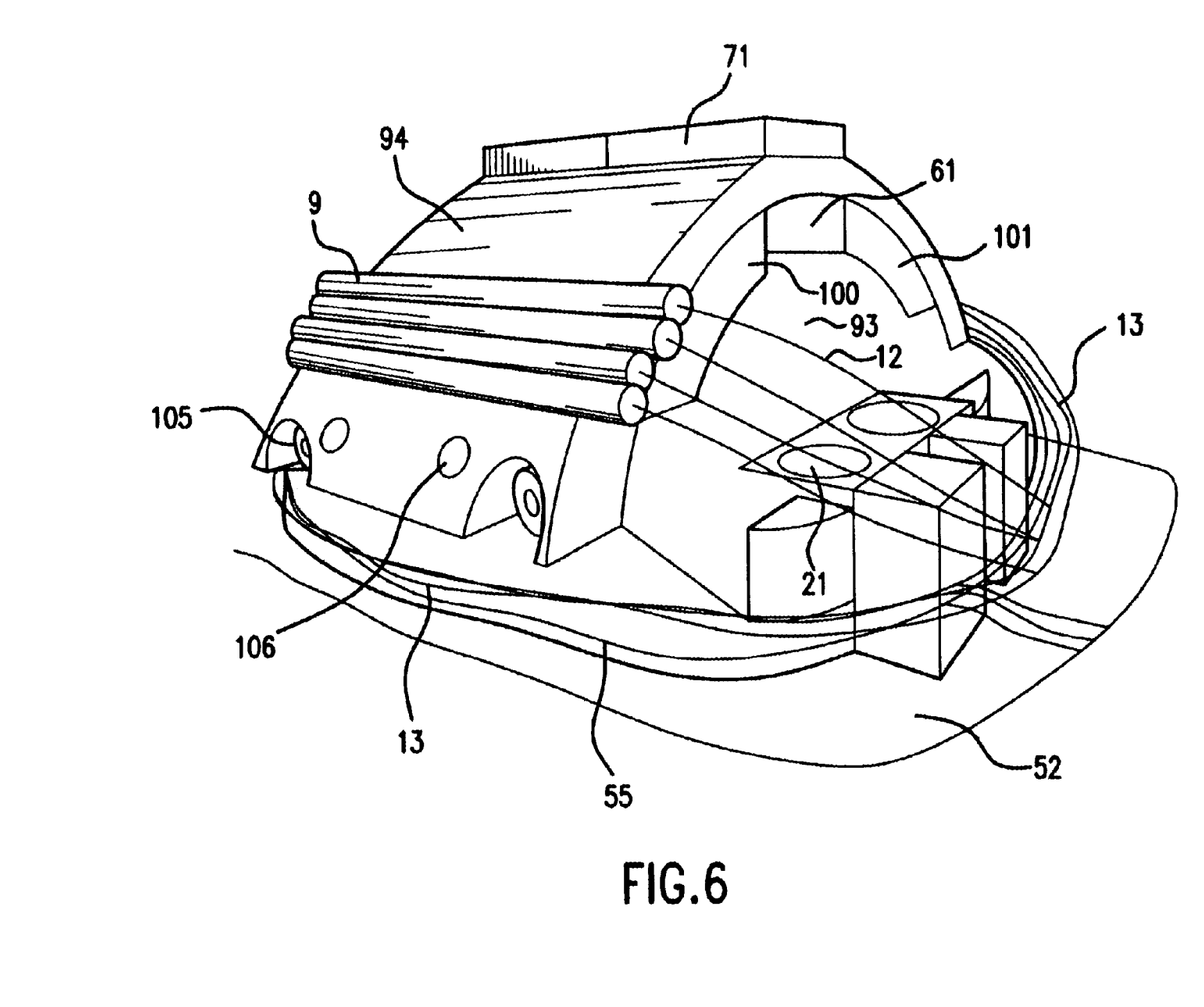
FIG. 6 is a perspective view of the arcuate retainer shown partially assembled.

FIGS. 2–6 show the arcuate retainer 92 for storing and securing the splices 5 in a static position. The retainer 92 includes a base 93 having a portion with an upper surface 96 having an arcuate shape. The base 93 is preferably removably attached to shelf 52 with screws 21. However, the base 93 may be formed as part of the shelf 52 or permanently attached to the shelf 52. The upper surface 96 preferably includes a center step 61 and lateral steps or ledges 62 in the base 93 on opposing sides of center step 61. Each of the steps 61 and 62 extend longitudinally, preferably for the length of the arcuate retainer 92. The steps 61 and 62 help define an area for organizing and placing splices 5 on the base when a middle cover 94 is attached to the base 93. Also, the center step 61 divides the area for storing the splices 5. As shown in FIG. 5, the splices 5 are placed on the arcuate outer convex surface 96 of base 93. The center step 61 of the base 93 divides the area for storing splices 5 into two sections 100 and 101 which are arcuate-shaped storage channels. Sections 100 and 101 are curved in a plane perpendicular to the longitudinal axis of the splices 5 stored in the sections. In addition sections 100 and 101 are angularly spaced from a longitudinal axis 7. By providing two storage sections 100 and 101, the splices 5 are organized, so the fibers 12 connected to the splices 5 are less susceptible to being tangled. In addition, organizing the splices 5 in two sections allows the splices 5 to be quickly identified, since the splices 5 are not all grouped together. This can be beneficial when utilizing fibers in multiple bundles. Also, if desired, the upper surface 96 may be grooved (not shown) or otherwise subdivided, so each splice can fit in between two grooves when placed on the base. The grooves can help maintain the splices 5 in a static position when the splices 5 are secured by a cover.

As shown in FIG. 5, the middle cover 94 rests on the center step 61 and the lateral ends 64 of the base 93. The middle cover 94 includes a concave lower surface 98 that provides the top boundary of storage sections 100 and 101. Like base 93, middle cover 94 includes a center step 71 and lateral steps or ledges 72 on opposing sides of the center step 72 in the lateral ends 64 of the middle cover 94. Each of the steps 71 and 72 extend longitudinally, preferably the length of the retainer 92. The steps help define additional areas 102 and 103 for organizing and placing splices 5. The lateral steps 72 also help support splices 5. In addition, the center step 71 of middle cover 94 divides the area for storing the splices into two sections 102 and 103 which are arcuate-shaped channels. Similar to sections 100 and 101, sections 102 and 103 are angularly spaced from the longitudinal axis 7 of the joint box 22, and sections 102 and 103 are curved in a plane perpendicular to the longitudinal axis of the splices stored in the sections. Also, as shown in FIG. 5, sections 100 and 101 are radially spaced from sections 102 and 103 respectively, and sections 100 and 101 are radially and angularly spaced from sections 103 and 102 respectively.

The middle cover 94 is preferably removably attached to the base 93 with recessed middle cover screws 105. The middle cover screws 105 are positioned on the lateral sides of the lateral steps 72 and on the top of center step 71 in order to affix middle cover 94 to the center step 61 and lateral steps 62 of the base 93. The screws 105 extend through the middle cover 94 into the base 93. When middle cover 94 is screwed into the base 93, the splices 5 in sections 100 and 101 are secured by the middle cover 94 against the base 93. The width of each of the storage sections 100–103 is generally the same as the width of a splice 5, except the width of each of the storage sections 100–103 is slightly less in order to provide a light clamping force. The length of the screw hole for screws 105 are designed so that when the middle cover 94 is screwed into the base 93, enough pressure is applied to the splices 5 in sections 100 and 101 to provide the light clamping force to secure the splices in a static position without damaging the splices 5. Also, the middle cover 94 includes an arcuate convex upper surface 97 for placing splices 5 thereon. If desired, the upper surface 97 may be grooved or subdivided as described for upper surface 96.

A top cover 95 includes a concave lower surface 107 that provides the top portion of the storage sections 102 and 103. The top cover 95 is removably attached to the middle cover 94 with top cover screws 106 that affix the top cover 95 to the center step 71. Other top cover screws 106 affix the top covers 95 to the lateral sides of the lateral steps 72 of middle cover 94. It is recognized that the screws 105 and 106, and their associated holes are positioned to avoid interference with one another. The top cover 95 secures the splices 5 in sections 102 and 103 against the middle cover 94 without damaging the splices 5.

The arcuate shape of the base 93 and covers 94 and 95, which define arcuate storage sections 100–103, make efficient use of the limited space in a joint box for storing the maximum number of splices. Indeed, the joint box 20 is preferably circular in cross section, and the arcuate shapes of the splice storage sections 100–103 are preferably generally radial. Accordingly, this maximizes the storage space inside the joint box 20. Additionally, the arcuate shape allows the splices to be layered and organized, so the splices are readily identifiable and accessible.

The base 93 as shown is generally circularly shaped, but the base 93 may be oval, square, octagonal or any desirable shape.

Although, the preferred embodiment of arcuate retainer 92 includes two layers of fibers, the arcuate retainer may include more than two covers to accommodate more than two layers of fibers. Furthermore, any desirable arrangement for removably attaching the covers may be implemented. Also, the covers 94 and 95 and the base 93 may be made of high strength steel or other materials with the requisite strength and durability. In addition, if desired, a metal cover, not shown, is attached around the body 3, and a plastic sleeve, also not shown, may sealingly surround the entire joint box 20 in a conventional manner for waterproofing and insulating purposes.

The present invention has been described in terms of preferred and exemplary embodiments thereof. Numerous other embodiments, modifications and variations within the scope and spirit of the appended claims will occur to persons of ordinary skill in the art from a review of this disclosure.

What is claimed is:

1. An apparatus comprising:
   a plurality of optical fiber splices, each of said optical fiber splices connecting optical fiber segments; and
   a first retainer, said first retainer including a first arcuate-shaped storage channel for retaining more than one of said plurality of splices, wherein said arcuate-shaped storage channel is curved in a plane perpendicular to longitudinal axes of said splices stored in said channel.

2. The apparatus of claim 1 wherein said first retainer further includes:
   a first element, said fist element having a convex surface forming a bottom portion of said first channel, and
   a second element, said second having a concave surface forming a top portion of said first channel and retaining more than one of said plurality of optical fiber splices in said first channel between said first and second elements.

3. The apparatus of claim 2 wherein said first retainer further includes:
   a second arcuate-shaped storage channel for storing more than one of said plurality of splices, wherein said second channel is radially spaced from said first channel with respect to a longitudinal axis parallel to longitudinal axes of said plurality of splices.

4. The apparatus of claim 3 wherein said first retainer further includes:
   a third element, said third element having a concave surface forming a top portion of said second channel, and said second element having a convex surface forming a bottom portion of said second channel.

5. The apparatus of claim 1 further comprising:
   a cylindrically shaped joint box, and said first retainer is located in said joint box.

6. The apparatus of claim 4 wherein said more than one of said plurality of splices in said first channel are secured in a static position in said first channel, and said more than one of said plurality of splices in said second channel are secured in a static position in said second channel.

7. The apparatus of claim 5 wherein said joint box further includes:
   a middle section,
   a center shelf, said center shelf divides said middle section into first and second compartments, and
   said first retainer is positioned on said center shelf in said first compartment.

8. The apparatus of claim 7 wherein said joint box further includes:
   a second retainer, said second retainer is positioned on said center shelf in said second compartment.

9. The apparatus of claim 7 wherein said center shelf longitudinally divides said middle section.

10. The apparatus of claim 5 further comprising:
    a fiber optical network, wherein said plurality of splices and said joint box are part of said fiber optical network.

11. The apparatus of claim 3 wherein said first element includes:
    a center step, and
    end steps in the lateral ends of said first element, wherein said center step and said end steps extend the length of said first retainer and contact said second element.

12. The apparatus of claim 11 wherein said first retainer further includes:
    a third arcuate-shaped storage channel angularly spaced from said first channel, wherein said third channel retains more than one of said plurality of splices, and said first and third channels are separated by said center step.

13. The apparatus of claim 4 wherein said second element is removably attached to said first element, and said third element is removably attached to said second element.

14. A system for storing splices in a joint box, comprising:
    a base having a longitudinal axis and an outer arcuate surface defining one side of at least one arcuate-shaped storage channel; and
    at least a first portion over said base, said first portion having an inner arcuate surface facing said outer arcuate surface of said base to define an opposite side of said at least one arcuate-shaped storage channel, wherein said arcuate-shaped channel extends longitudinally in the direction of the longitudinal axis of the base.

15. The system of claim 14 wherein said base includes at least one step forming a plurality of angular spaced arcuate-shaped storage channels.

16. The system of claim 14 wherein said first portion has an outer arcuate surface, and further comprising at least a second portion over said first portion, said second portion having an inner arcuate surface facing said outer arcuate surface of said first portion to define an opposite side of another said arcuate shaped storage channel.

17. The system of claim 16 wherein said first portion includes at least one step forming a plurality of angular spaced arcuate-shaped storage channels between said first portion and said second portion.

18. The system of claim 16 wherein said first portion is a middle portion and said second portion is a top portion.

19. The system of claim 18 further comprising a cover over said top portion.

20. A joint box comprising:
    a center section having at least one compartment for housing and protecting spliced sections of fibers;

cable termination sections connected to each end of said center section; and at least one retainer disposed within said at least one compartment, said retainer including at least one arcuate-shaped storage channel extending generally longitudinally with respect to said center section for retaining a plurality of splices such that said splices extend generally longitudinally with respect to said center section.

21. The joint box of claim 20 wherein said center section includes a shelf dividing said center section into first and second compartments.

22. The joint box of claim 21 wherein said at least one retainer includes first and second retainers disposed in said first and second compartments, respectively.

23. The joint box of claim 20 wherein said retainer includes a plurality of arcuate-shaped storage channels.

24. The joint box of claim 23 wherein said plurality of arcuate-shaped storage channels are radially spaced.

25. The joint box of claim 23 wherein said plurality of arcuate-shaped storage channels are angularly spaced.

26. The joint box of claim 20 wherein said retainer includes a base having an outer arcuate surface defining one side of said at least one arcuate-shaped storage channel.

27. The joint box of claim 26 wherein said base includes at least one step forming a plurality of angular spaced arcuate-shaped storage channels.

28. The joint box of claim 26 wherein said retainer includes at least a first portion over said base, said first portion having an inner arcuate surface facing said outer arcuate surface of said base to define an opposite side of said at least one arcuate-shaped storage channel.

29. The joint box of claim 28 wherein said first portion has an outer arcuate surface, and wherein said retainer includes at least a second portion over said first portion, said second portion having an inner arcuate surface facing said outer arcuate surface of said first portion to define an opposite side of another arcuate-shaped storage channel.

30. The joint box of claim 23 wherein said retainer includes a plurality of arcuate-shaped portions forming a plurality of arcuate-shaped channels.

* * * * *